United States Patent
Ro et al.

(10) Patent No.: US 10,408,482 B2
(45) Date of Patent: Sep. 10, 2019

(54) MANAGING ENVIRONMENTAL CONDITIONS

(71) Applicant: Bitfinder, Inc., Cupertino, CA (US)

(72) Inventors: Ronald Ro, Cupertino, CA (US); Kevin Cho, Sunnyvale, CA (US); Bosung Kim, San Carlos, CA (US); Dae-oong Kim, Cupertino, CA (US)

(73) Assignee: BITFINDER, INC., Cupertino, CA (US)

( * ) Notice: Subject to any disclaimer, the term of this patent is extended or adjusted under 35 U.S.C. 154(b) by 240 days.

(21) Appl. No.: 15/041,525

(22) Filed: Feb. 11, 2016

(65) Prior Publication Data

US 2016/0231014 A1    Aug. 11, 2016

Related U.S. Application Data

(60) Provisional application No. 62/115,081, filed on Feb. 11, 2015.

(51) Int. Cl.
| | |
|---|---|
| *G01M 1/38* | (2006.01) |
| *F24F 11/30* | (2018.01) |
| *G05B 15/02* | (2006.01) |
| *F24F 11/62* | (2018.01) |
| *F24F 110/00* | (2018.01) |
| *F24F 110/70* | (2018.01) |
| *F24F 120/20* | (2018.01) |

(52) U.S. Cl.
CPC ............. *F24F 11/30* (2018.01); *F24F 11/62* (2018.01); *G05B 15/02* (2013.01); *F24F 2110/00* (2018.01); *F24F 2110/70* (2018.01); *F24F 2120/20* (2018.01); *G05B 2219/2642* (2013.01)

(58) Field of Classification Search
CPC .. G01N 33/0075; G01N 33/00; G01N 1/2273; G01N 1/24; G01N 1/26; G01N 2001/021; G01N 33/0034; G01N 33/004; G01N 33/0062; F24F 11/30; F24F 11/62; F24F 2110/50; F24F 2110/70; F24F 2110/72; F24F 11/46; F24F 11/52; F24F 11/56; F24F 11/63; F24F 11/64; F24F 2110/10; F24F 2110/12; F24F 2120/10; F24F 2120/12; F24F 2120/20; A61B 2562/0219; A61B 5/0002; A61B 5/002; A61B 5/0022; A61B 5/01; A61B 5/02055; A61B 5/021; A61B 5/024; A61B 5/1118; A61B 5/4806; A61B 5/681; A61B 5/7475

See application file for complete search history.

(56) References Cited

U.S. PATENT DOCUMENTS

| | | | |
|---|---|---|---|
| 6,344,798 B1 * | 2/2002 | Schell | G08B 17/117 200/61.03 |
| 6,782,351 B2 | 8/2004 | Reichel et al. | |

(Continued)

*Primary Examiner* — Robert G Bachner
(74) *Attorney, Agent, or Firm* — Mannava & Kang, P.C.

(57) ABSTRACT

According to an example, in a method for managing environmental conditions in a structure, environmental data may be received in a computing device from an environmental condition monitoring device. The computing device may compute a score corresponding to the environmental condition in the structure based upon the received environmental data. In addition, the computing device may determine an environmental condition management operation with respect to the environmental conditions in the structure based upon the computed score.

18 Claims, 5 Drawing Sheets

(56) References Cited

U.S. PATENT DOCUMENTS

| | | | |
|---|---|---|---|
| 2001/0026240 A1* | 10/2001 | Neher | G01S 5/0018 342/357.75 |
| 2006/0173579 A1 | 8/2006 | Desrochers et al. | |
| 2010/0289643 A1 | 11/2010 | Trundle | |
| 2013/0174646 A1* | 7/2013 | Martin | G01N 33/00 73/31.02 |
| 2013/0310986 A1 | 11/2013 | Gust | |
| 2014/0005837 A1* | 1/2014 | Fadell | F24F 11/0009 700/276 |
| 2014/0184406 A1 | 7/2014 | Trundle | |
| 2014/0303787 A1* | 10/2014 | Struckmeier | G06F 1/206 700/276 |
| 2015/0052975 A1* | 2/2015 | Martin | G01N 33/00 73/31.02 |
| 2015/0212057 A1 | 7/2015 | Darveau | |
| 2016/0054021 A1 | 2/2016 | Lee | |
| 2016/0062332 A1 | 3/2016 | Call | |
| 2016/0139575 A1 | 5/2016 | Funes | |
| 2016/0178225 A1 | 6/2016 | Vallikannu | |
| 2016/0267764 A1* | 9/2016 | Park | G08B 21/18 |

\* cited by examiner

MANAGING ENVIRONMENTAL CONDITIONS

CLAIM FOR PRIORITY

This application claims the benefit of priority under 35 U.S.C. § 119(e) to U.S. Provisional Application Ser. No. 62/115,081, filed on Feb. 11, 2015, the disclosure of which is incorporated herein by reference in its entirety.

BACKGROUND

The measurement and evaluation of indoor air quality have improved over time. For instance, an increasing number of air quality monitoring devices that have a number of features as well as relatively compact sizes are becoming more readily available. The air quality monitoring devices typically measure the conditions inside of a space, such as a residential, commercial, or industrial environment. The measured conditions may be evaluated to determine whether the conditions are at healthy and/or comfortable levels and modifications to the conditions, such as temperature and humidity, may be made based upon the outcome of the evaluated conditions.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein a method for managing environmental conditions in a structure. Also disclosed herein are a computing device that may implement the method and a machine readable storage medium on which instructions for the method may be stored. The method disclosed herein may include receiving, at a computing device, environmental data from an environmental condition monitoring device, computing, by the computing device, a score corresponding to the environmental condition in the structure based upon the received environmental data, and determining, by the computing device, an environmental condition management operation with respect to the environmental conditions in the structure based upon the computed score.

As described herein, an environmental condition monitoring device may monitor environmental conditions in the structure and may communicate the environmental condition data pertaining to the monitored conditions to the computing device. In addition, the computing device may analyze and process the received environmental data to determine, for instance, how conditions in the structure are to be manipulated to achieve a desired goal. The desired goal may be, for instance, conditions that meet a user's preferences. Moreover, the computing device output instructions to an environmental condition modifying device to modify the environmental conditions according to the determined manipulation.

Figure 1:
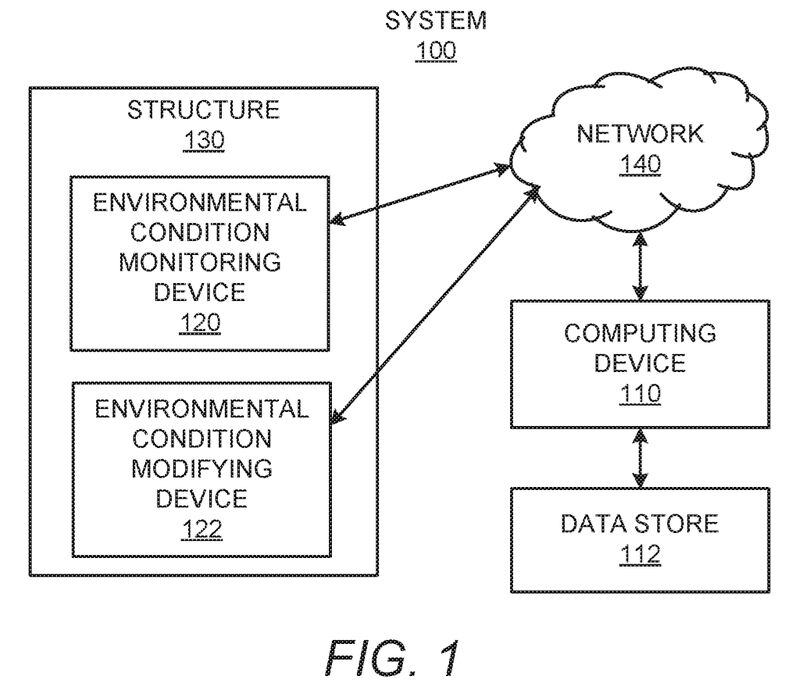
FIG. 1 shows a simplified diagram of an example system within which an example computing device may be implemented.

With reference first to FIG. 1, there is shown a simplified diagram of an example system 100 within which an example computing device 110 may be implemented. It should be understood that the example system 100 depicted in FIG. 1 may include additional components and that some of the components described herein may be removed and/or modified without departing from the scope of the system 100.

The system 100 is depicted as including a computing device 110, an environmental condition monitoring device 120, and an environmental condition modifying device 122. The environmental condition monitoring device 120 and the environmental condition modifying device 122 are shown as being positioned within a structure 130. The structure 130 may be an indoor structure such as a room in a house, an office in an office building, a gym, a warehouse, or the like. The structure 130 may also be an entire house, office building, etc., or other relatively enclosed space, such as a vehicle, an airplane, or the like. According to an example, and as discussed in greater detail herein below, the environmental condition monitoring device 120 may detect one or more environmental conditions, such as temperature, humidity, carbon dioxide concentration, volatile organic compounds, dust, etc., inside the structure 130. The environmental condition monitoring device 120 may communicate environmental data pertaining to the detected environmental condition(s) to the computing device 110.

The environmental condition modifying device 122 may modify one or more of the environmental conditions detected by the environmental condition monitoring device 120. For instance, the environmental condition modifying device 122 may be an air condition system, a humidifier, a de-humidifier, an air purifier, a heating system, a fan, an actuator for a window, a ventilation system, etc. In other examples, the environmental condition modifying device 122 may also include other types of devices, such as lights, doors, network connected devices, etc.

As shown in FIG. 1, the computing device 110 may be external to the structure 130 and may communicate with the environmental condition monitoring device 120 via a network 140. The computing device 110 may also communicate with the environmental condition modifying device 122 via the network 140. In addition, or alternatively, the computing device 110 may communicate with the environmental condition modifying device 122 through the environmental condition monitoring device 120. In this example, the computing device 110 may communicate instructions for the environmental condition modifying device 122 via the network 140 and the environmental condition monitoring device 120.

The network 140 may be the Internet, an Intranet, a Wide Area Network, or the like. In any regard, the computing device 110, which may be a server computer that communicates with a plurality of environmental condition monitoring devices 120, may receive the environmental conditions from the environmental condition monitoring device(s) 120 and may store the received environmental conditions in a data store 112. For instance, the computing device 110 may store the received environmental conditions in databases on the data store 112. Additionally, although a single computing device 110 has been shown in FIG. 1, it should be understood that multiple computing devices, e.g., servers may implement the features of the computing device 110 discussed herein. By way of example, a first computing device (e.g., first server) may receive the environmental conditions and may forward the received environmental conditions to a second computing device (e.g., second server) and the second computing device may analyze the received environmental conditions.

In any regard, the computing device 110 may analyze the environmental data received from the environmental condition monitoring device 120 to determine, for instance, an environmental condition management operation with respect to the environmental conditions in the structure. For instance, the computing device 110 may determine whether the environmental conditions within the structure 130 are within desirable ranges or if the conditions are abnormal, e.g., outside of predetermined ranges. In response to a determination that the environmental conditions within the structure 130 are abnormal, the computing device 110 may output an instruction to the environmental condition modifying device 122 to modify an appropriate environmental condition. Various other examples with respect to the management operations that may be determined by the computing device 110 are discussed in greater detail hereinbelow.

Figure 2:
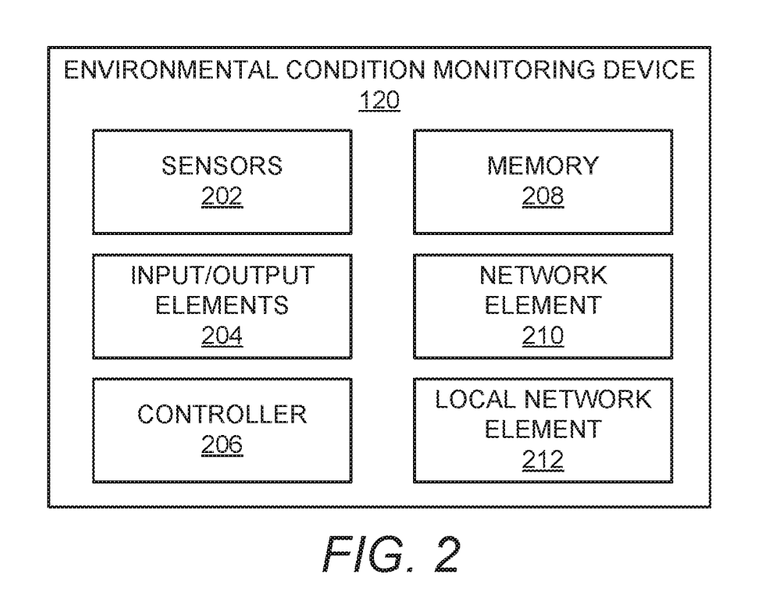
FIG. 2 shows a block diagram of the environmental condition monitoring device depicted in FIG. 1, according to an example.

Turning now to FIG. 2, there is shown a block diagram of the environmental condition monitoring device 120 depicted in FIG. 1, according to an example. It should be understood that the environmental condition monitoring device 120 depicted in FIG. 2 may include additional components and that some of the components described herein may be removed and/or modified without departing from the scope of the environmental condition monitoring device 120.

As shown in FIG. 2, the environmental condition monitoring device 120 may include a plurality of sensors 202. The sensors 202 may include, for instance, sensors that are to detect various environmental conditions, such as temperature, humidity, carbon dioxide concentration, volatile organic compounds, dust, carbon monoxide, etc. In addition, the environmental condition monitoring device 120 may include input/output elements 204, which may include, for instance, a microphone, a camera, a speaker, a digital display, lights, a user interface, command buttons, etc. Thus, for instance, the environmental condition monitoring device 120 may receive audible inputs from users and may also output visual and/or auditory signals to users. By way of example, the environmental condition monitoring device 120 may receive voice commands and/or may output information audibly.

The environmental condition monitoring device 120 may further include a controller 206 and a memory 208. The controller 206 may be a semiconductor-based microprocessor, a central processing unit (CPU), an application specific integrated circuit (ASIC), and/or other hardware device. The memory 208 may store, for instance, environmental data collected by the sensors 202 and/or input received through the input/output elements 204. The memory 208 may also store instructions that the controller 206 may execute in collecting, storing, and communicating environmental data as well as in receiving user inputs and outputting information to users. In any regard, the memory 208 may be a Random Access Memory (RAM), an Electrically Erasable Programmable Read-Only Memory (EEPROM), a storage device, an optical disc, or the like.

The environmental condition monitoring device 120 may further include a network element 210 and a local network element 212. The network element 210 may include hardware to enable the environmental condition monitoring device 120 to communicate over the network 140. For instance, the network element 210 may include an antenna through which the controller 206 may wirelessly send and receive wifi signals. The local network element 212 may also include hardware to enable the environmental condition monitoring device 120 to communicate with nearby user devices, such as mobile telephones, tablet computers, personal computers, laptop computers, etc. The local network element 212 may include, for instance, hardware to enable communication via BLUETOOTH™, ZIGBEE™, or the like.

The environmental condition monitoring device 120 may perform geofencing through use of a beacon (not shown). For instance, the environmental condition monitoring device 120 may periodically monitor mobile devices that are within range of the beacon. Once a mobile device is within range and has registered itself, the environmental condition monitoring device 120 may send environmental condition data to the mobile device. In addition, the environmental condition monitoring device 120 may track the duration at which the mobile device has been connected to beacon to obtain determine the length of time that the user of the mobile device has been exposed to the environmental conditions in the structure 130. As another example, the environmental condition monitoring device 120 may enable/disable and/or monitor the environment condition modifying device 122.

According to an example, the environmental condition monitoring device 120 may be a standalone device that is to be placed in a location within the structure 130 at which environmental conditions are to be monitored. In another example, the environmental condition monitoring device 120 may be a wearable device that a user may wear. In a further example, the environmental condition monitoring device 120 may communicate with a wearable device (not shown), which may be an electronic device that may be worn on a user's wrist or elsewhere on a user's body or clothing. In this example, the environmental condition monitoring device 120 may communicate data to the wearable device. In addition or alternatively, a user may control an environmental condition modifying device 122 through the wearable device. By way of example, the wearable device is a gateway to deliver commands from a user to the computing device 110, which may communicate instructions to the environmental condition modifying device 122. In a further example, the wearable device may be used as an interface through which a user may control the environmental condition monitoring device 120. In a yet further example, the wearable device may track a user's activity state, e.g., whether the user is sleeping, active, walking, sitting, exercising, etc., and that data may be communicated to the computing device 110. The computing device 110 may process that data to determine the state of the user during measured environmental conditions and may provide context relevant recommendations and insights to the user based upon the determination.

According to an example, the environmental condition monitoring device 120 may implement a dynamic sensor data sampling based upon whether a mobile device, e.g., an authenticated and designated mobile device, is determined to be within the geofencing perimeter of the environmental condition monitoring device 120. In this example, the environmental condition monitoring device 120 may increase the frequency at which samples of the environmental condition are detected when the mobile device is determined to be within the geofencing perimeter. The environmental condition monitoring device 120 may further incorporate abnormalities in macro weather conditions and sensor data to determine the frequency at which the environmental condition monitoring device 120 samples detection of the environmental conditions.

Various manners in which the computing device 110 may be implemented are described in greater detail below with respect to FIGS. 3-8.

Figure 3:
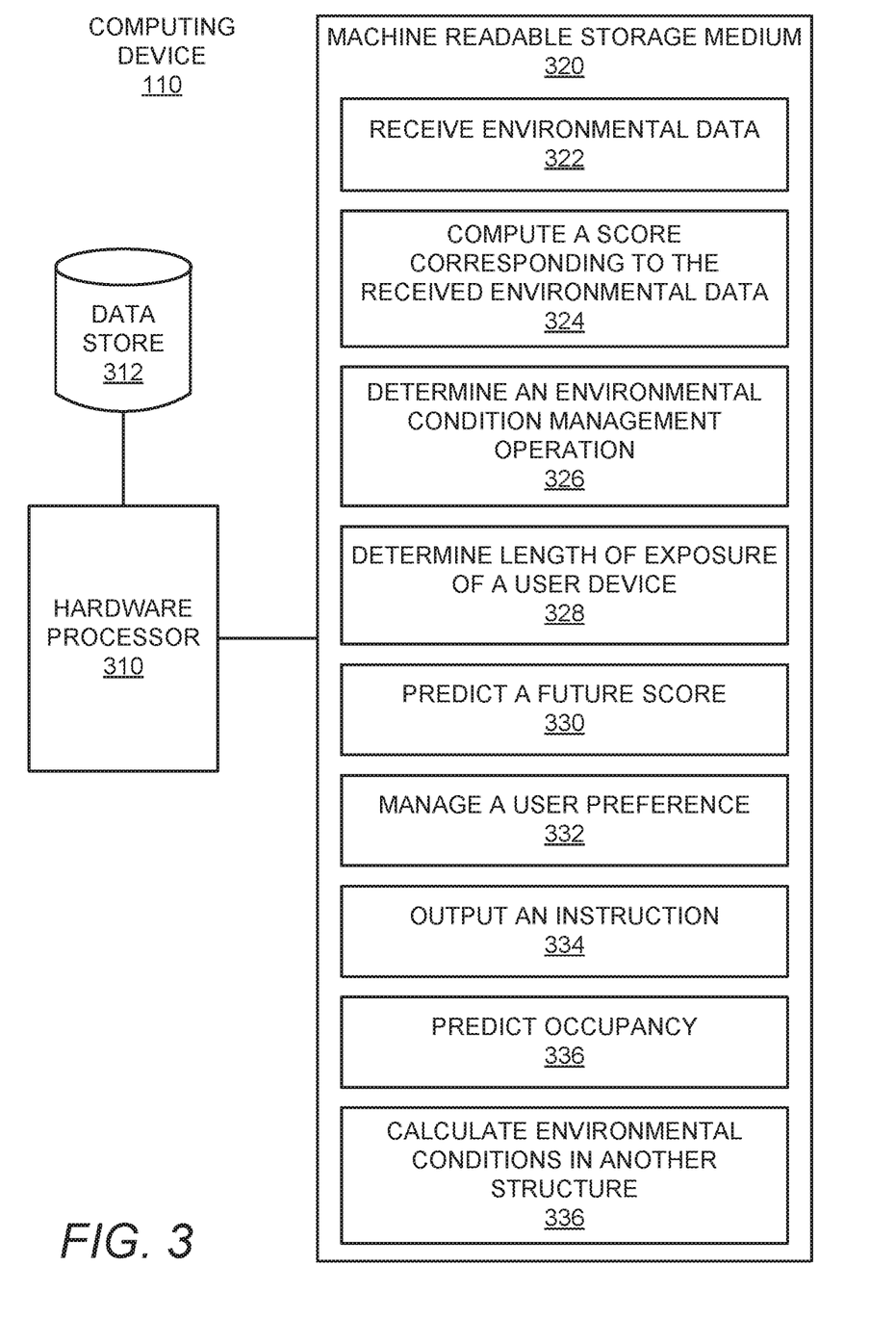
FIG. 3 depicts a simplified block diagram of the computing device depicted in FIG. 1, according to an example.

With reference first to FIG. 3, there is shown a simplified block diagram of the example computing device 110 depicted in FIG. 1. It should be understood that the computing device 110 depicted in FIG. 3 may include additional components and that some of the components described herein may be removed and/or modified without departing from the scope of the computing device 110.

In one example, the computing device 110 is a server computer. In other examples, the computing device 110 may be other types of computing devices, such as, a personal computer, a laptop computer, a smartphone, a tablet computer, or the like.

The computing device 110 is shown in FIG. 3 as including a hardware processor 310 and a data store 312. The hardware processor 310 may be a semiconductor-based microprocessor, a central processing unit (CPU), an application specific integrated circuit (ASIC), and/or other hardware device. The data store 312 may be a Random Access Memory (RAM), an Electrically Erasable Programmable Read-Only Memory (EEPROM), a storage device, an optical disc, or the like. In addition, the data store 312 may store, for instance, environmental data received from one or more environmental condition monitoring devices 120, data pertaining to the structure 130 or structures within which the one or more environmental condition monitoring devices 120 are located, information regarding the users of the one or more environmental condition monitoring devices 120, and the like.

The computing device 110 is also depicted as including a machine readable storage medium 320 on which is stored machine readable instructions 322-336 that the hardware processor 310 may execute. More particularly, the hardware processor 310 may fetch, decode, and execute the instructions to receive environmental data 322, compute a score corresponding to the received environmental data 324, determine an environmental condition management operation 326, determine length of exposure of a user device 328, predict a future score 330, manage a user preference 332, output an instruction 334, predict occupancy in a structure 336, and calculate environmental conditions in another structure 336. As an alternative or in addition to retrieving and executing instructions, the hardware processor 310 may include one or more electronic circuits that include electronic components for performing the functionalities of the instructions 322-336. In any regard, the hardware processor 310 may communicate instruction signals to either or both of the environmental condition monitoring device 120 and the environmental condition modifying device 122.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage device, an optical disc, and the like. The machine-readable storage medium 320 may be a non-transitory machine-readable storage medium, where the term "non-transitory" does not encompass transitory propagating signals.

According to an example, the computing device 110 may include a plurality of hardware processors 310 and/or a hardware processor 310 containing a plurality of cores. In these examples, each the plural hardware processors 310 and/or cores may operate in parallel, i.e., use parallel processing techniques to analyze environmental data received from respective ones of multiple environmental condition monitoring devices. In this regard, the use of multiple hardware processors 310 and/or cores may reduce the amount of time required to receive, analyze, and manage environmental condition data received from one or more environmental condition monitoring devices 120. In addition, the use of multiple hardware processors 310 and/or cores may reduce the amount of time required to determine how one or more environmental condition modifying devices 122 are to be manipulated as well as to manipulate the one or more environmental condition modifying devices 122.

According to an example, the hardware processor 310 may implement a subscription and publishing service for a plurality of environmental condition monitoring devices 120, for instance, to stream real-time information to distributed client devices via the network 140. In this example, the computing device 110 may handle a number of connections for streaming of real-time data from the plurality of environmental condition monitoring devices 120 as the data is stored to persistent storage, e.g., in the data store 312. In addition, the computing device 110 or another server may provide authentication services to handle the granting and revoking credentials of client devices required to access the streamed information. For instance, the computing device 110 may provide streaming data to authenticated client devices that subscribe to receive the streamed data.

Turning now to FIGS. 4-8, there are shown example methods 400-800 for managing environmental conditions in a structure 130. It should be apparent to those of ordinary skill in the art that the methods 400-800 may represent generalized illustrations and that other operations may be added or existing operations may be removed, modified, or rearranged without departing from the scopes of the methods 400-700.

The descriptions of the methods 400-800 are made with reference to the computing device 110 illustrated in FIGS. 1 and 3 for purposes of illustration. It should, however, be clearly understood that apparatuses having other configurations may be implemented to perform any of the methods 400-800 without departing from the scopes of the methods 400-800.

Figure 4:
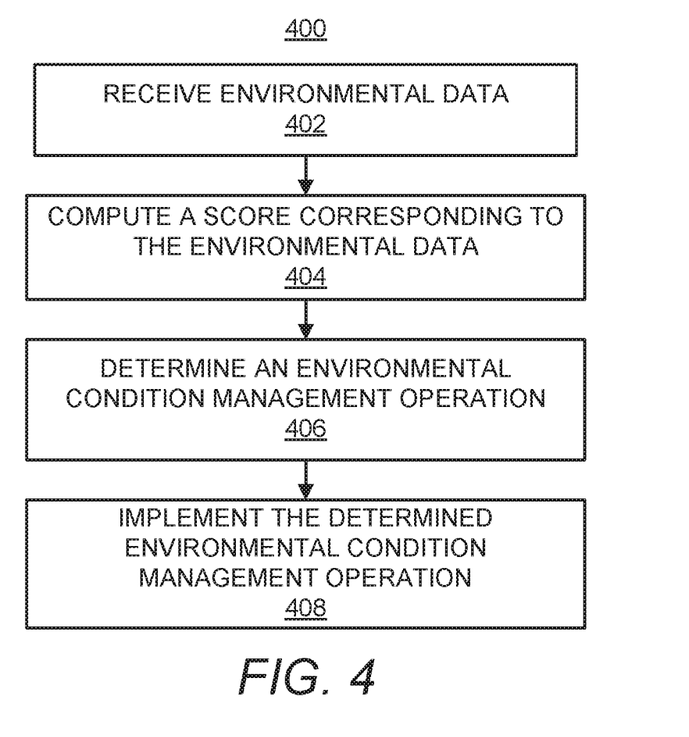
FIGS. 4-8, respectively, depict example methods for managing environmental conditions in a structure.

With reference first to FIG. 4, at block 402, environmental data may be received from an environmental condition monitoring device 120. For instance, the sensors 202 in the environmental condition monitoring device 120 may detect environmental conditions in a structure 130 and may communicate data pertaining to the detected environmental conditions to the computing device 110 via the network 140. In addition, the hardware processor 310 may execute the instructions 322 to receive the environmental data from the environmental condition monitoring device 120. The hardware processor 310 may also store the received environmental data in the data store 312. According to an example, the hardware processor 310 may receive environmental data from the environmental condition monitoring device 120 at periodic intervals, for instance, at predetermined times during a day, in response to detected changes in environmental condition by the environmental condition monitoring device 120, at predetermined intervals in time, or the like.

At block 404, a score corresponding to the environmental condition in the structure may be computed based upon the received environmental data. Particularly, the hardware processor 310 may execute the instructions 324 to compute the score. According to an example, the score may pertain to a comfort level and/or a productivity level. The comfort level may be an indication of how restful a user feels in a particular environment. The productivity level may be an indication of how focused a user in a particular environment feels with respect to performing a task, for instance, the mental clarity that the user may have. The value of the score may depend upon various detected environmental conditions in the structure 130. For instance, the score may vary depending upon the level of carbon dioxide ($CO_2$), humidity level, temperature, etc., of the ambient conditions in the structure 130. In addition, external factors such as macro weather conditions, historical data patterns, and the like, may be incorporated into the calculation of the score so that the score may reflect the receiving user's current indoor air quality. Moreover, the score may differ depending upon whether a score is being computed for a user's comfort level or a user's productivity level.

At block 406, an environmental condition management operation may be determined with respect to the environmental conditions in the structure 130 based upon the computed score. Particularly, the hardware processor 310 may execute the instructions 326 to determine the environmental condition management operation. According to an example, the environmental condition management operation may be a operation pertaining to whether one or more environmental conditions in the structure 130 are to be modified based upon the computed score. By way of example in which the environmental condition data is $CO_2$, the computed score may be below a predetermined value, which may be an indication that the user's productivity level may be negatively affected. In this example, the hardware processor 310 may determine that the $CO_2$ concentration level inside the structure 130 is to be decreased based upon the computed score being lower than the predetermined value. By way of particular example in which the environmental condition monitoring device 120 is set up in an office with the environmental condition preference being set to a high productivity level, the computing device 310 may execute the instructions 324 to calculate the score with a higher weighting towards $CO_2$ data as opposed to, for instance, humidity level. In this example, $CO_2$ is one of the largest impacting components of air quality in terms of a person's productivity level in the work environment.

At block 408, the environmental condition management operation made at block 406 may be implemented. For instance, the hardware processor 310 may execute the instructions 334 to output an instruction to the environmental condition monitoring device 120 or the environmental condition modifying device 122 to modify an environmental condition in the structure 130. In keeping with the example above, the hardware processor 310 may execute the instructions 334 to output an instruction for the environmental condition modifying device 122 to decrease the $CO_2$ concentration level inside the structure 130.

According to another example, the hardware processor 310 may receive input from a user regarding the size and average occupancy of the structure 130, for instance, through a user device. In this example, the hardware processor 310 may execute the instructions 336 to predict or otherwise determine an occupancy in the structure 130 based upon detected changes in the environmental conditions inside the structure 130. By way of example, the hardware processor 310 may determine a predicted number of people inside the structure 130 based upon the $CO_2$ concentration level detected in the structure 130. That is, the hardware processor 310 may use the average amount of $CO_2$ that a person typically generates and may divide the detected $CO_2$ concentration level with the average amount to predict the occupancy in the structure 130. As discussed in greater detail with respect to the following figures, the hardware processor 310 may determine other types of environmental condition management operations.

Figure 5:
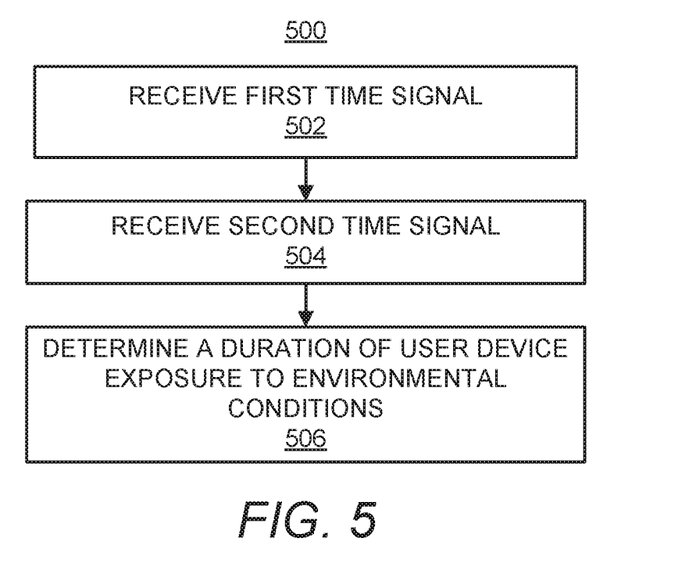

Turning now to FIG. 5, there is shown a method 500 of an example of an environmental condition management operation determined at block 406 and implemented at block 408 in FIG. 4. At block 502, a first time signal corresponding to a first time at which a user device (not shown) is within range of a beacon (not shown) in the structure 130 may be received. The beacon may be integrated or otherwise form part of the environmental condition monitoring device 120 and may detect when a user device is within a signal range of the beacon or vice versa. In addition, either the beacon, e.g., the environmental condition monitoring device 120, or the user device, which may be cellular telephone, tablet computer, or the like, may communicate the first time signal to the computing device 110. The first time signal may include an identification of the beacon, an identification of the user device, a timestamp, etc. According to an example, the hardware processor 310 may execute the instructions 328 to receive the first time signal.

At block 504, a second time signal corresponding to a second time at which the user device is out of range of the beacon in the structure 130 may be received. The beacon and/or the user device may detect when the user device is outside of the signal range of the beacon. In addition, either the beacon, e.g., the environmental condition monitoring device 120, or the user device, may communicate the second time signal to the computing device 110. The second time signal may also include an identification of the beacon, an identification of the user device, a timestamp, etc. According to an example, the hardware processor 310 may execute the instructions 328 to receive the second time signal.

At block 506, a duration of time that the user device has been exposed to the detected environmental conditions within the structure 130 may be determined based upon a calculated difference between the first time signal and the second time signal. Particularly, the hardware processor 310 may execute the instructions 328 to determine the duration of time based upon a calculated difference in the timestamps contained in the first time signal and the second time signal. In addition, the hardware processor 310 may output the determined duration along with an indication of the environmental conditions, e.g., air quality values, to the user device, for instance, via the network 140.

Figure 6:
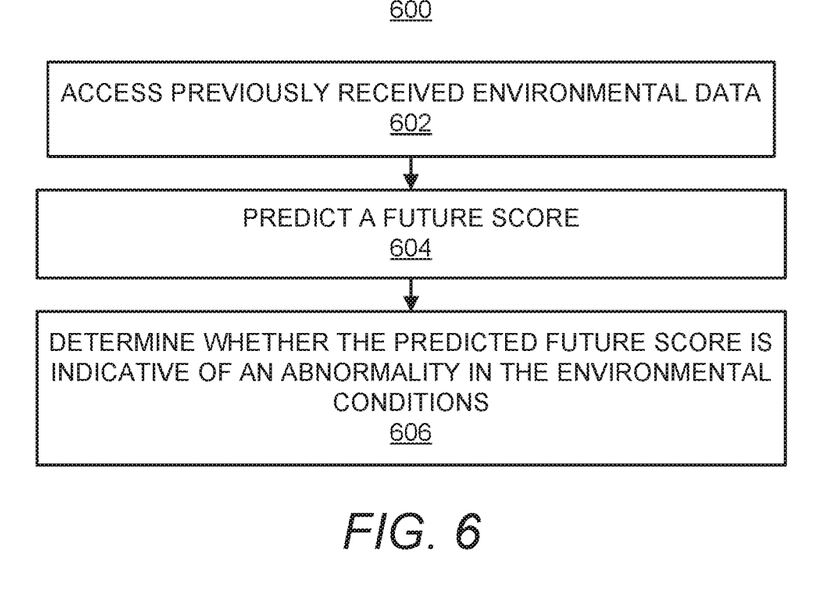

Turning now to FIG. 6, there is shown a method 600 of another example of an environmental condition management operation determined at block 406 and implemented at block 408 in FIG. 4. At block 602, a database containing information regarding previously received environmental data may be accessed. Particularly, the hardware processor 310 may execute the instructions 330 to access previously received environmental data that has been stored in the data store 312.

At block 604, a future score for the environmental conditions in the structure 130 may be predicted based upon an analysis of the previously received environmental data. Particularly, the hardware processor 310 may analyze the previously received environmental data to identify historical trends of the environmental conditions. For instance, the hardware processor 310 may track how environmental conditions have changed over time to determine if there is a particular trend in the manner in which the environmental conditions have changed and from that trend, predict a score corresponding to the forecasted environmental conditions. By way of example, the historical data stored in the data store 312 may be clustered in a several distinct groups of air quality patterns and the group to which a particular environmental condition belongs may be identified. In addition, the identification may be used to predict the future score for a particular setting of the environmental condition modifying device 122.

At block 606, a determination may be made as to whether the predicted future score is indicative of an abnormality in the environmental conditions. Particularly, the hardware processor 310 may execute the instructions 330 to compare the predicted future score with a predetermined threshold score and to determine that the future score is indicative of an abnormality in response to the predicted future score being either above or below the predetermined threshold depending upon, for instance, whether an excessive score or a low score is undesirable. In response to a determination that the predicted future score is indicative of an abnormality, the hardware processor 310 may output an alert to a user and/or may output an instructions signal to an environmental condition modifying device 122 to modify an environmental condition and thus prevent the abnormal environmental condition from occurring.

Figure 7:
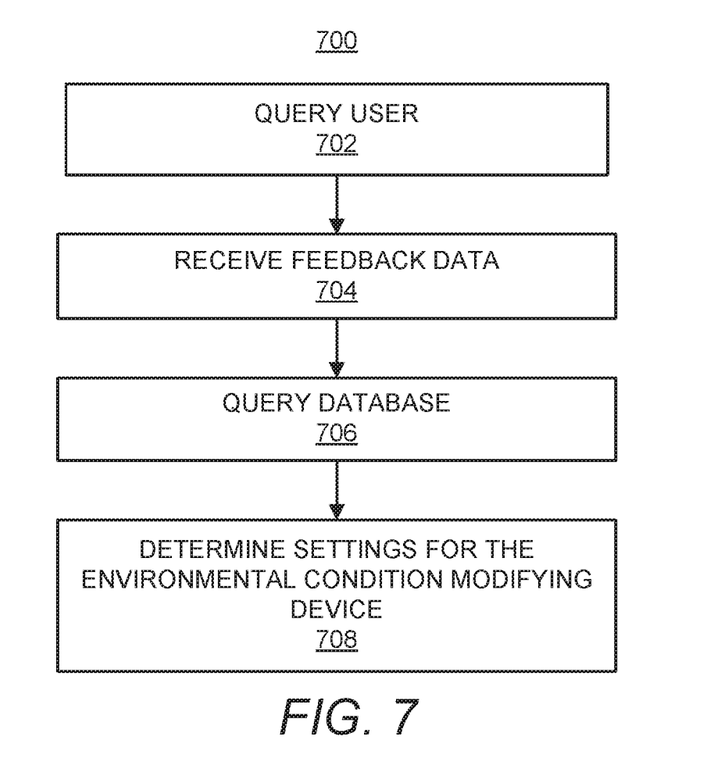

Turning now to FIG. 7, there is shown a method 700 of another example of an environmental condition management operation determined at block 406 and implemented at block 408 in FIG. 4. At block 702, a user may be queried to provide responses regarding the user's environmental condition preferences. Particularly, the hardware processor 310 may execute the instructions 332 to communicate instructions to the environmental condition monitoring device 120 to display or otherwise output a query to the user, e.g., through the input/output elements 204. For instance, the hardware processor 310 may query the user for the user's preferences in various environmental condition settings, such as temperature, whether the conditions should be set for higher comfort levels, whether the conditions should be set for higher productivity levels, or the like. In other examples, the user may be queried through a computing device, a wearable device, etc.

At block 704, feedback data may be received from a user responsive to the query outputted to the user. According to an example, the user may submit responses to the query via the input/output elements 204 of the environmental condition monitoring device 120. In other examples, the user may submit responses to the query via a computing device, a wearable device, etc. In any of these examples, the user may submit the responses via a physical interface, e.g., a keyboard, a touchscreen, or the like, or via a voice enabled interface, e.g., a microphone. In addition, the responses may be provided via natural language input. The responses may include the user's preferences in the environmental condition settings. In this regard, the hardware processor 310 may receive the responses via the network 140 and may store the received responses in the data store 312.

At block 706, a database may be queried for previously collected user preferences. Particularly, the hardware processor 310 may query a database stored in the data store 310 for the previously collected user preferences. The previously collected user preferences may be from the user and/or may be from other users, e.g., users of the same or a different environmental condition monitoring device 120 and may be clustered into different user preference relationships. The previously collected user preferences may identify correlations between different environmental condition settings, e.g., comfort levels, productivity levels, etc., and settings of the environmental condition modifying device 122.

At block 708, settings for the environmental condition modifying device 122 may be determined based upon a user's feedback data and the previously collected user preferences. Particularly, the hardware processor 310 may execute the instructions 332 to determine the recommendation by comparing the user feedback data, e.g., the type of environmental condition that the user would like to exist in the structure 130, with the previously collected user preferences. By way of example in which the user has selected a highly comfortable environment, the hardware processor 310 may determine a previously collected user preference that is identified as resulting in a highly comfortable environment. In addition, the hardware processor 310 may identify the settings of the environmental condition modifying device 122 corresponding to the identified previously collected user preference.

In addition, the hardware processor 310 may output instructions to cause the environmental condition modifying device 122 to operate at the determined settings. Various manners in which the hardware processor 310 may output the instructions are described above with respect to block 408 in FIG. 4.

According to another example, the hardware processor 310 may automatically trigger modification of an environmental condition based upon the user preference and/or the user's historical patterns. The recommendation may also be based upon information received from the user, for instance, square footage of the space in the structure 130, the number of windows/ventilations in the structure 130, etc. In this example, the hardware processor 310 may incorporate this information and the user feedback to make the determination at block 708.

Figure 8:
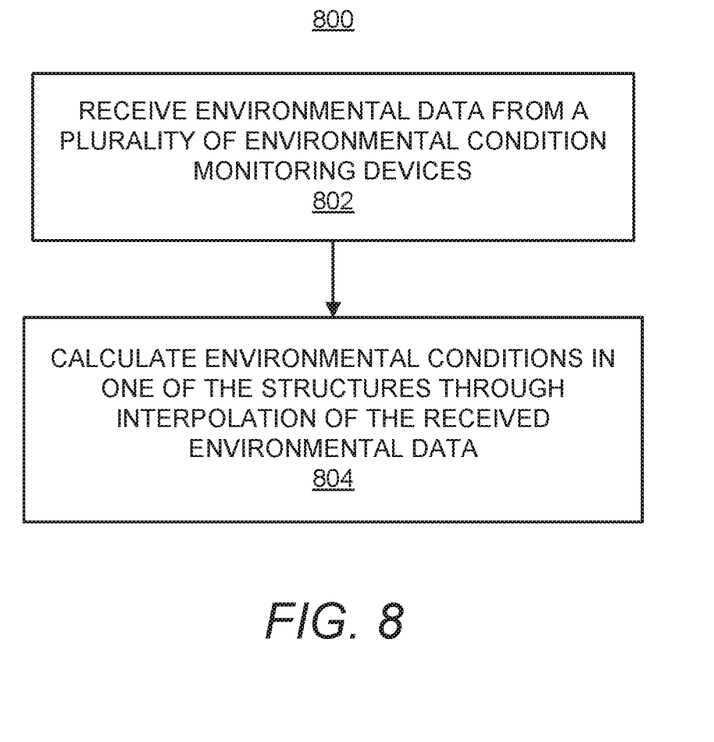

Turning now to FIG. 8, there is shown a method 800 of another example of an environmental condition management operation determined at block 406 and implemented at block 408 in FIG. 4. At block 802, environmental data may be received from a plurality of environmental condition monitoring devices 120, in which the plurality of environmental condition monitoring devices 120 are located at multiple structures 130, and in which the structures 130 are rooms inside of a building. Particularly, the hardware processor 310 may execute the instructions 322 to receive the environmental data from the plurality of environmental condition monitoring devices 120.

At block 804, environmental conditions in one of the structures 130 of the multiple structures may be calculated through interpolation of the environmental data received from the plurality of environmental condition monitoring devices 120 located in other structures 130 of the multiple structures. Particularly, the hardware processor 310 may execute the instructions 336 to interpolate the environmental conditions in the structure 130 using the environmental data received from the environmental condition monitoring devices 120 positioned in the other structures. For instance, the hardware processor 310 may be provided with information pertaining to the locations of the structures 130 with respect to each other as well as the locations of the environmental condition monitoring devices 120. The hardware processor 310 may use this information to, for instance, apply weights to environmental data based upon the proximities of the structures 130 containing the environmental condition monitoring devices 120 with respect to the structure 130 that does not contain an environmental condition monitoring device 120. The hardware processor 310 may further output instruction signals to an environmental condition modifying device 122 in the structure 130 in response to the calculated environmental conditions for that structure 130.

According to an example, the hardware processor 310 may analyze the environmental data received from the plurality of environmental condition monitoring devices 120 and may also receive publically broadcasted environmental data. For instance, the hardware processor 310 may calculate the environmental conditions, such as the amount of certain gases, from the received data. In addition, the hardware processor 310 may publish this information to entities, such as organizations, hospitals, governments, insurance companies, etc., that subscribe to receive this information.

According to another example, the hardware processor 310 may execute a product recommendation engine that calculates the likelihood of a user liking certain products based upon user feedback and sensor data from the environmental condition monitoring device 120. The product recommendation engine may also take into account the macro weather data, the season of the year, previously calculated environmental conditions, and the like, to predict the user's preference for certain products that may improve the environmental conditions in the structure 130.

Some or all of the operations set forth in the methods 400-800 may be contained as utilities, programs, or subprograms, in any desired computer accessible medium. In addition, the methods 400-800 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing environmental conditions in a structure, said method comprising:

receiving, at a computing device, environmental data from an environmental condition monitoring device;

computing, by the computing device, a score corresponding to the environmental condition in the structure based upon the received environmental data;

determining, by the computing device, an environmental condition management operation with respect to the environmental conditions in the structure based upon the computed score;

receiving, at the computing device, a first time signal corresponding to a first time at which a user device is within range of a beacon in the structure;

receiving, at the computing device, a second time signal corresponding to a second time at which the user device is out of range of the beacon;

determining, at the computing device, a length of time that the user device has been exposed to the detected environmental conditions within the structure based upon a calculated difference between the first time signal and the second time signal; and controlling, by the computing device, an environmental condition modifying device to modify an environmental condition in the structure based on at least one of the determined environmental condition management operation and the determined length of time that the user device has been exposed to the determined environmental conditions within the structure.

2. The method according to claim 1, wherein computing the score further comprises computing at least one of a productivity score and a comfort level score, wherein the productivity score is an indication of how focused a user in the structure feels with respect to performing a task and wherein the comfort level score is an indication of how restful a user feels in the structure.

3. The method according to claim 1, further comprising:
accessing a database containing information regarding previously received environmental data;
predicting, based upon an analysis of the previously received environmental data, a future score for the environmental conditions; and
determining whether the predicted future score is indicative of an abnormality in the environmental conditions.

4. The method according to claim 1, further comprising:
querying a user for responses regarding the user's environmental condition preferences;
receiving feedback data from the user responsive to the query;
querying a database for previously collected user preferences; and
determining settings for the environmental condition modifying device based upon the feedback data and the previously collected user preferences.

5. The method according to claim 1, wherein determining the environmental condition management operation further comprises determining that the environmental conditions in the structure are to be modified.

6. The method according to claim 1, further comprising:
predicting an occupancy in the structure from the received environmental data.

7. The method according to claim 1, further comprising:
receiving, at the computing device, environmental data from a plurality of environmental condition monitoring devices, wherein the plurality of environmental condition monitoring devices are located at multiple structures, and wherein the structures are rooms inside of a building; and calculating environmental conditions in one of the structures of the multiple structures through interpolation of the environmental data received from the plurality of environmental condition monitoring devices located in other structures of the multiple structures.

8. The method according to claim 7, further comprising:
analyzing the environmental data received from the plurality of environmental condition monitoring devices; and
outputting information pertaining to the analyzed environmental data to a plurality of entities that have subscribed to receive the information.

9. A computing device for managing environmental conditions in a structure, said apparatus comprising:
a hardware processor; and
a machine-readable storage medium on which is stored instructions that are to cause the hardware processor to:
receive environmental data from an environmental condition monitoring device;
compute a score corresponding to the environmental condition in the structure based upon the received environmental data; and
determine an environmental condition management operation with respect to the environmental conditions in the structure based upon the computed score;
receive a first time signal corresponding to a first time at which a user device is within range of a beacon in the structure;
receive a second time signal corresponding to a second time at which the user device is out of range of the beacon;
determine a length of time that the user device has been exposed to the detected environmental conditions within the structure based upon a calculated difference between the first time signal and the second time signal; and
control an environmental condition modifying device to modify an environmental condition in the structure based on at least one of the determined environmental condition management operation and the determined length of time that the user device has been exposed to the determined environmental conditions within the structure.

10. The computing device according to claim 9, wherein the instructions are further to cause the hardware processor to:
access a database containing information regarding previously received environmental data;
predict, based upon an analysis of the previously received environmental data, a future score for the environmental conditions; and
determine whether the predicted future score is indicative of an abnormality in the environmental conditions.

11. The computing device according to claim 10, wherein the instructions are further to cause the hardware processor to:
in response to a determination that the predicted future score is indicative of an abnormality in the environmental conditions, determine the environmental condition management operation to be an environmental condition management operation that causes the environmental conditions in the structure to be within normal levels.

12. The computing device according to claim 9, wherein the instructions are further to cause the hardware processor to:
query a user for responses regarding the user's environmental condition preferences;
receive feedback data from the user responsive to the query;
query a database for previously collected user preferences; and
determine settings for the environmental condition modifying device based upon the feedback data and the previously collected user preferences.

13. The computing device according to claim 9, wherein to determine the environmental condition management operation, the instructions are further to cause the hardware processor to determine that the environmental conditions in the structure are to be modified.

14. The computing device according to claim 9, wherein the environmental condition comprises a carbon dioxide concentration level in the structure, and wherein the instructions are further to cause the hardware processor to:
predict an occupancy in the structure based upon a detected carbon dioxide concentration level in the structure.

15. A non-transitory machine readable storage medium on which is stored machine readable instructions that when executed by a hardware processor, cause the hardware processor to:
receive environmental data from an environmental condition monitoring device;
compute a score corresponding to the environmental condition in the structure based upon the received environmental data;
determine an environmental condition management operation with respect to the environmental conditions in the structure based upon the computed score;
receive a first time signal corresponding to a first time at which a user device is within range of a beacon in the structure;
receive a second time signal corresponding to a second time at which the user device is out of range of the beacon;
determine a length of time that the user device has been exposed to the detected environmental conditions within the structure based upon a calculated difference between the first time signal and the second time signal; and
control an environmental condition modifying device to modify an environmental condition in a structure based on at least one of the determined environmental condition management operation and the determined length of time that the user device has been exposed to the determined environmental conditions within the structure.

16. The non-transitory machine readable storage medium of claim 15, wherein the instructions are further to cause the hardware processor to:
access a database containing information regarding previously received environmental data;
predict, based upon an analysis of the previously received environmental data, a future score for the environmental conditions; and
determine whether the predicted future score is indicative of an abnormality in the environmental conditions.

17. The non-transitory machine readable storage medium of claim 15, wherein the instructions are further to cause the hardware processor to:
query a user for responses regarding the user's environmental condition preferences;

receive feedback data from the user responsive to the query;

query a database for previously collected user preferences; and determine settings for the environmental condition modifying device based upon the feedback data and the previously collected user preferences.

18. The non-transitory machine readable storage medium of claim 15, wherein the environmental condition comprises a carbon dioxide concentration level in the structure, and wherein the instructions are further to cause the hardware processor to:

predict an occupancy in the structure based upon a detected carbon dioxide concentration level in the structure.

* * * * *